Feb. 23, 1971  D. R. CRAIG ET AL  3,565,626
COIL FILM PROCESS

Filed July 25, 1967  2 Sheets-Sheet 1

INVENTORS
DWIN R. CRAIG
JOHN SYTCH

BY Darby & Darby

ATTORNEYS

Feb. 23, 1971 D. R. CRAIG ET AL 3,565,626
COIL FILM PROCESS
Filed July 25, 1967 2 Sheets-Sheet 2

INVENTORS
DWIN R. CRAIG
JOHN SYTCH
BY Darby & Darby
ATTORNEYS

United States Patent Office 3,565,626
Patented Feb. 23, 1971

3,565,626
COIL FILM PROCESS
Dwin R. Craig, Falls Church, Va., and John Sytch, Hagerstown, Md., assignors, by mesne assignments, to Ingenuics, Inc., Gaithersburg, Md., a corporation of Maryland
Filed July 25, 1967, Ser. No. 655,798
Int. Cl. G03c *3/02, 5/24, 5/26*
U.S. Cl. 96—78
9 Claims

ABSTRACT OF THE DISCLOSURE

A coil film process and apparatus in which adjacent convolutions of a coil of film are positively held in spaced relationship on a spool by soluble separator material. The material is dissolved and the film is further processed in coiled form with the spacing between convolutions maintained by a special processing spool which admits fluids to the film wound on the spool.

---

Processing of large quantities of photographic film has heretofore required large amounts of time and/or equipment. In a typical prior art development process and apparatus, the film is passed in unwound form through a battery of solutions in specified sequence and for given durations. As should be apparent, the speed of this so-called serial development process is largely controlled by the speed at which the unwound film can be passed through the various solutions. In one typical prior art system, in which black and white film having a process cycle of five minutes is passed in serpentine fashion through a number of tanks with 100 feet of film in the solution at any one time, it requires 50 minutes to develop 1000 feet of film moving at a speed of 20 feet per minute. The tanks themselves require about 60 cubic feet of space.

In general, equipment for high-speed serial or continuous processing is relatively complex and costly. Consequently, there is a need for a development process and apparatus which are not only more economical but also considerably faster. Heretofore, so-called parallel film processing has been attempted in which the film is developed while it is held in a coil. As should be apparent, a successful system of this type would be advantageous since a spool of film need only be moved a small distance through a solution (or solution moved a small distance through the film) to accomplish the same result which would require a considerably longer path length and time if the film on the spool were processed unwound.

In general, prior art attempts at coiled film processing have been generally unsuccessful. The main reasons for this is that no really economical and easy way was available to satisfactorily coil the film on the processing spool and maintain the necessary spacing and evenness in spacing between adjacent layers of the coil. For example, spools with spiral grooves formed in the flanges have been tried but these are difficult to use in the sense that it is difficult to wind the film on these spools and hold it there during the processing cycle. Further, spools of this type are fairly costly to produce.

The present invention overcomes the disadvantages of the prior art and permits parallel film processing to be carried out in a simple and economical way with the film on the spool at all times. In accordance with the invention, the film is wound on a spool with adjacent convolutions of the film coil held in a positive and predetermined spaced relationship by soluble separator material. The separator material is applied to the film as it is being wound onto the spool. The edges of the film are clamped between the textured inner surfaces of the flanges of the spool so that when the separator material is dissolved, which occurs in the first processing step or a preprocessing step, the spaced relationship originally established by the separator material is maintained. As described in greater detail below, the processing spool which holds the film is constructed to admit the necessary solution to all parts of the film so that it can be developed quickly and with high quality.

It is therefore an object of the present invention to provide a process and apparatus for developing coiled photographic film.

A further object is to provide a process and apparatus for winding a web of material on to a coil with adjacent convolutions of the coil held in spaced relationship by soluble separator material.

Another object is to provide a process and aparatus for winding a web of material onto a coil with adjacent convolutions of the web separated by soluble material and maintaining the spacing after the material has been dissolved.

Other objects and advantages of the present invention will become more apparent upon reference to the following specification and annexed drawings in which.

Figure 1:
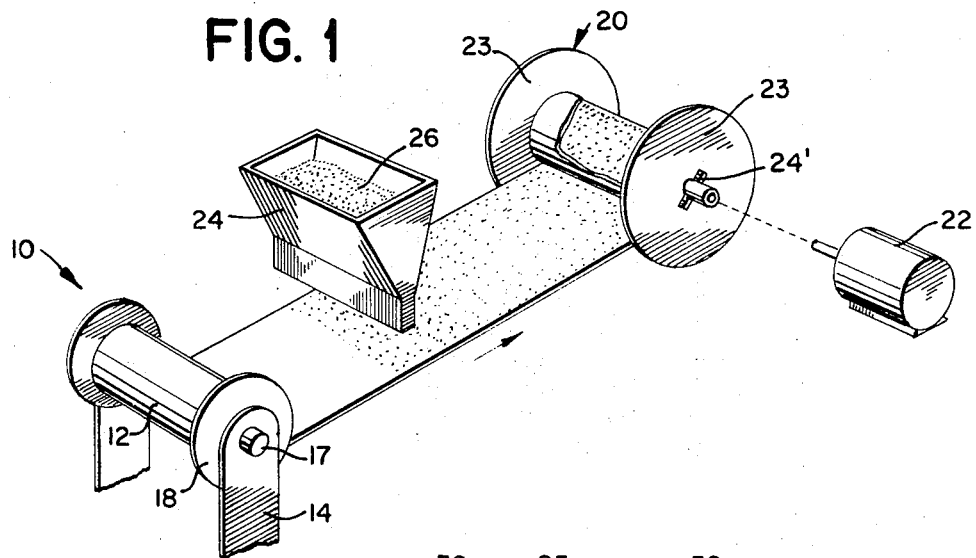
FIG. 1 is a perspective view of a generalized version of the equipment and a portion of the process of the present invention.

FIG. 1 shows in generalized form an apparatus for carrying out the invention in which soluble particles of solid material are sprinkled onto the surface of an exposed photographic film as it is being wound into a coil to produce a substantially predetermined spacing between adjacent convolutions of the coiled film. Here a supply spool 10 holding exposed photographic film 12, either color or black and white, is held in a suitable bracket 14 by any conventional mechanism (not shown) such as, for example, a shaft through the spool axle or suitable means for entering keyed holes 17 in the spool flanges 18. A take-up spool 20 is rotated by a motor 22 or any other suitable drive mechanism, either mechanical or manual, to pull the film off the supply spool 10 and wind it onto the take-up spool 20. Suitable braking and/or tensioning apparatus (not shown) can be used to maintain tension of the film between the supply and take-up spools.

Located between the supply spool 10 and the take-up spool 20 is a hopper 24 which holds a quantity of soluble separating material, here shown as being particles of solid material 26. The characteristics of the separator material, and different types thereof, are described in greater detail below. In the embodiment of FIG. 1, the film is unwound from the supply spool 10 onto the take-up spool 20 at a substantially constant speed. As the film passes under the hopper 24 a quantity of the separator material particles 26 are spread over the face of the film in a random pattern. As should be apparent, as the exposed film is wound up onto the take-up spool 20, adjacent convolutions are separated from each other by a spacing determined by the size of the separator particles 26. The particles 26 are spread as evenly as possible on the film by the hopper 24 which may have any suitable screen or agitating mechanism (not shown) to ensure a more even flow of the particles. The density of the particle distribution (number of particles per unit of square measure) is not critical, the only requirements being that there be a sufficient number of particles to maintain an even spacing between adjacent convolutions of the film and that no portions of the adjacent convolutions are permitted to touch.

Take-up spool 20 of FIG. 1 preferably has flanges 23 which are easily removable. After all the exposed film, or a desired quantity thereof, is wound on to the take-up spool 20, these flanges 23 are removed. The film is now held on the axle 24 of spool 20 with the adjacent convolutions separated by the soluble material.

Figure 2:
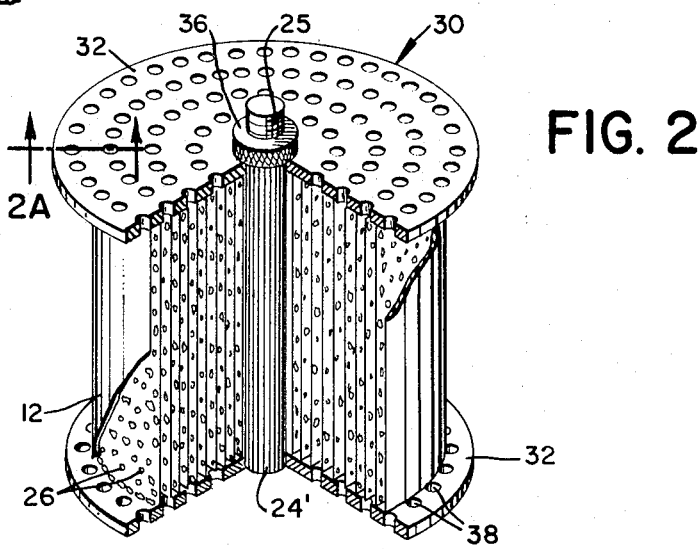
FIG. 2 is a perspective cut-away view of one form of processing spool.
Figure 2A:
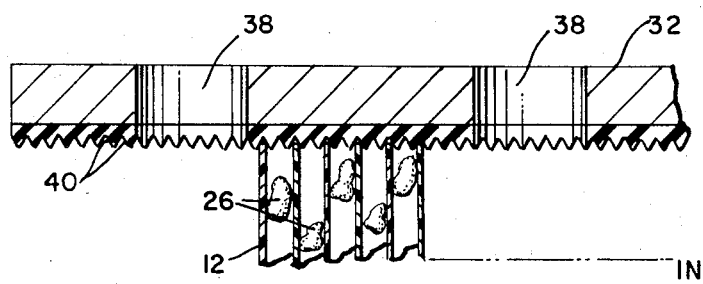
FIG. 2A is an elevational view taken in section, of one of the flanges of the processing spool.

The axle 24 with the film held thereon is removed from the take-up apparatus and is assembled as part of a processing spool 30. Referring now to FIGS. 2 and 2A, the processing spool 30 includes a pair of special end flanges 32 which can be fastened to the ends of axle 24 of the original take-up spool 20. The two special flanges 32 engage the edges of the wound film and are held to axle 24 by any suitable fastening means such as by nuts 36 fastened to the threaded ends 25 of the spool axle 24. Only one nut 36 is shown.

As shown in FIGS. 2 and 2A each of the special flanges 32 of the spool has a large number of holes 38 which extend completely through a respective flange to provide a substantially unrestricted fluid passage from outside of the flanges to the coiled film held between the two flanges. As shown in FIG. 2A, the holes or passages 38 may be angled slightly with respect to the flanges to create a helical type of flow throughout the film as will be described in greater detail below.

The inner film edge contacting surface of each of these special flanges 32 is textured and/or formed with a number of projections or fingers 40. Any suitable material can be used to form the textured inner surface of the flanges, for example, plastic or natural sponge material, rubber or synthetic material with extending fingers, and polypropylene or other plastic rug material with the extending strands clipped fairly close. The numerous projections of fingers 40 of the two flanges 32 extend into the spaces between the adjacent spaced convolutions of the film coiled on spool 30. As described below, the fingers or a resilient textured surface, maintain the spacing after the separator material is dissolved.

As shown in FIG. 1, the exposed film is preferably back-wrapped onto the take-up spool 20 with the emulsion side up and receiving the separator material. The reason for this is that the film always curls inwardly towards its longitudinal axis on the emulsion side. Therefore, back-wrapping gives the film additional strength when clamped between the special flanges 32 of the processing spool 30. The film is held on spool 30 without any tension along its longitudinal axis. The wind-up speed of the film onto spool 20 can be relatively fast, in the order of 200 ft. per minute, or even higher.

After the film is wound onto the processing spool 30 with the separator material positively establishing the spacing between the convolutions of the coil and the flanges 32 are clamped to the spool, the film is ready for further processing, such as developing. In processing, the entire spool 30 is immersed into some type of fluid. This, of course, dissolves the separator material which originally established the spacing. However, the spacing between the adjacent convolutions of the film will still be maintained after the particles 26 are dissolved due to the fact that the edges of the film are clamped between the inner surfaces of the spool flanges 32. Where fingers or projections 40 are used, they extend into the spaces at the edges of the film and maintain the spacing established originally by the separator material. Where a smoother resilient material is used, the material compresses on both fingers as they are clamped to the film.

As should be apparent, the soluble separator material permits a fairly normal processing cycle to be carried out. For example, while still in coil form with the separator material therein, the coil of the film can be dipped in sequence into (1) water with wetting agent to dissolve the separator material, (2) developer, (3) short stop, (4) hypo, (5) wash water, and (6) water with wetting agent. The particular type of developing solutions utilized and the exact processing sequence is unimportant since once the separator material is dissolved the spacing between the adjacent convolutions of the coil of film is still maintained by the clamping action of the spool flanges.

While it has been described above that the separator material is dissolved out first before processing the film in an active solution, this is not absolutely necessary. For example, if a developer solution is going to be used to process many batches of film then, of course, it probably is desirable to first immerse the processing spool 30 with the separator material into water to dissolve the separator material. If the developer solution is only going to be used once, then the separator material can be dissolved in the developer solution.

After the exposed film is developed by any suitable process involving any number of steps, it is dried. Drying can be carried out by any conventional techniques such as by blowers. It should be understood that the film is still retained on the processing spool 30 so that warm or hot air from a blower passes through the flange holes 38 between the adjacent convolutions of the film to dry both sides of each convolution simultaneously. This greatly speeds up the drying process. Once the film is dried, it is removed from spool 30. This can be done by removing the flanges 32, replacing the flanges 23 and then unwinding the fully dried film.

The soluble separator material can be selected from any of a number of types of material either solid, semi-solid or viscous in form. The material can also be chemically active or inactive with respect to the film and film processing.

The size of the soluble separator material determines the spacing of the adjacent convolutions of the film. In general, the spacing should be large enough to admit fluids easily between the convolutions but small enough to minimize bulk of the coil and volume of the solution required. The separator material ideally should have uniform size and if particulate material is used the particles ideally should be spherical and without sharp edges to avoid damage to film.

Experience has demonstrated that common salt (sodium chloride) can serve as the soluble separator material with no physical damage to photographic film, both color and black and white, and no measurable effect on sensitometry. Particles of common salt of a diameter from 20 mils to 60 mils have been used in practice. In processing black and white film, whose base and gelatin coating is usually not more than 4 to 7 mils thick in most types of films, particles having a size at the lower end of the 20–60 mil range are used. However, in color film, where the gelatin coatings are thicker, it is desirable to use the larger size separator particles.

Of course, other types of solid soluble particulate material can be used as the separator material. For example, any of the other more common salts such as calcium chloride and potassium chloride can be used. The only real requirements for solid material is that it have the proper size and shape, which can be achieved by suitable processing of the material, and that it does not react deleteriously with the film. While cost of the separator material is a consideration, it should be apparent that common salt and other similar materials are relatively inexpensive.

Instead of using particles of solid material, soluble viscous materials such as gels, can also be utilized. One class of such viscous materials which can be used are found in hair creams and dressings which are colorless and dissolvable in water.

The separator also can have the form of a web that dissolves. For example, an open-work lattice-type web made of a polyvinyl alcohol type of plastic will dissolve in water. In general, web materials of either the solid or lattice type are not quite as suitable as particulate materials, such as common table salt, since they will dissolve from the edge of the film inwardly rather than dissolve fairly uniformly as will particulate material. This will make developing somewhat more difficult.

The type of separator material utilized should be compatible with the dissolving rate of the first step of the developing process. That is, if the first step of the process is a wash, the material and wash should be compatible so that the separator material will be fully dissolved and cleared from the film before the next processing step is started.

As should be apparent, there is no limitation that the separator material be inert, that is not form a part of the chemical reaction required in the developing process. To the contrary, the separator material also can be active material which will comprise all or a part of the chemicals needed for the developing process. As a typical example of this, the separator material can be all of the chemicals required for monobath processing. By immersing spool 30 into a suitable solution the chemicals, which also serve as the spacers, are dissolved and the monobath developing process carried out in this solution. This permits, for example, film to be developed only by the addition of water if the chemicals used as the separator are dissolvable in water. Of course, the spacer material can include only the chemical or chemicals needed for the first step in the developing process.

Figure 3:
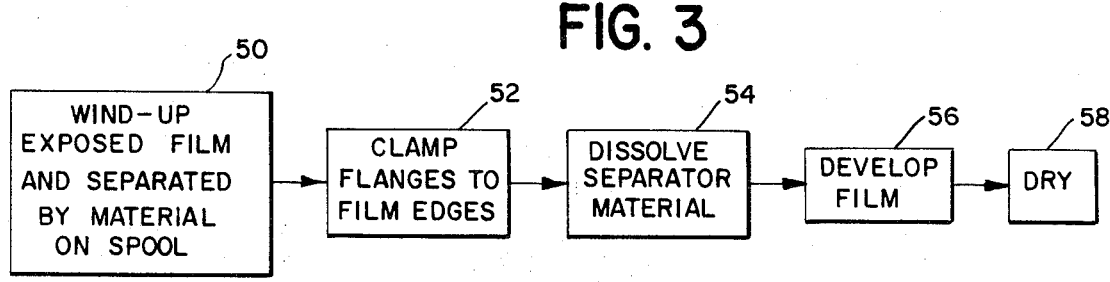
FIG. 3 is a flow diagram of the process of the invention.

FIG. 3 summarizes in a flow diagram the complete process of the invention as described previously. In this process, block 50 signifies the steps of winding the exposed film onto the take-up spool 20 and separating the adjacent convolutions with the soluble separator material. In block 52, the flanges of the processing spool 30 are clamped to the film edges to hold the spool with the positive spacing between adjacent convolutions provided by the separator material. In block 54, the separator material is dissolved in a liquid, this liquid being either a developing solution or a wash solution and the separator material being either an inert material or a material which contributes to the developing. In block 56, the developing of the film is carried out by any suitable process used for color or black and white film with the necessary number of steps. Block 58 represents drying of the film.

While the winding up of the film onto spool 20 and the clamping of the flanges 32 are shown as separate steps, it should be understood that it is possible to wind the exposed film directly onto the processing spool 30 without using the intermediate take-up spool 20. In this case the textured inner surfaces of flanges 32 would be resilient and relatively smooth so as not to bend the ends of the film. A sponge material can be used for this purpose.

Figure 4:
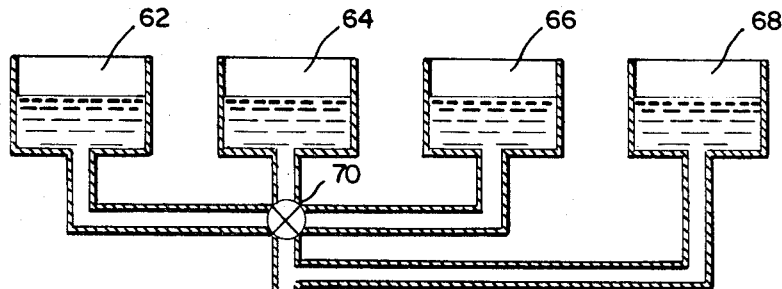
FIGS. 4 and 5 are diagrammatic views of several types of apparatus for carrying out the developing process.

The process of FIG. 3 can be carried out manually, such as by dipping a processing spool 30 sequentially into containers holding the various wash and/or developing solutions. However, this is rather time-consuming and it is desirable to speed up and at least partially automate the developing operation. FIG. 4 shows one such arrangement for doing this. Here, two processing spools 30 with the coils of film thereon with layers spaced positively by the separator material are loaded into a tank 60. Containers of one or more developing solutions 62, fixing solution 64 and wash water 66 are provided to feed the tank. An air drying source 68 such as a fan is also provided. The containers 62, 64 and 66 are connected by respective conduits through a control valve 70 to the tank 60. The outlet of the tank has an outlet valve 72 in an exhaust line 74.

After one or more spools 30 are placed in the container 60, the separator material is dissolved either by applying wash water or a developing solution from the containers 62 and 66. This solution passes freely through the spaced convolutions of the film, which are held in spaced relationship after the separator material dissolves, by the porous flanges 32. As indicated above, the holes 38 in the flanges can be angled. This permits a generally helical flow of fluid within the spool when the fluid is admitted to tank 60. Stacking the spools one on top the other in the manner shown in FIG. 4 still permits the various fluids to flow through and contact all of the film of both spools in view of the fact that the flanges 32 have numerous holes therein.

It should be apparent from FIG. 4 that the developer, fix and water solutions can be admitted into the tank 60 to perform their functions for any suitable time and in any needed time sequence as controlled by the valve 70. This valve 70 may be manually or automatically controlled by any suitable means. Between sequential steps of applying solutions, the tank 60 is drained through the valve 72 and the exhaust line 74. After the film is developed, drying air of a given temperature from source 68 is supplied to the tank under considerable pressure. The various solutions in the containers 62, 64 and 66, as well as the tank 60, can be heated either externally or internally to maintain given solution temperatures.

Figure 5:
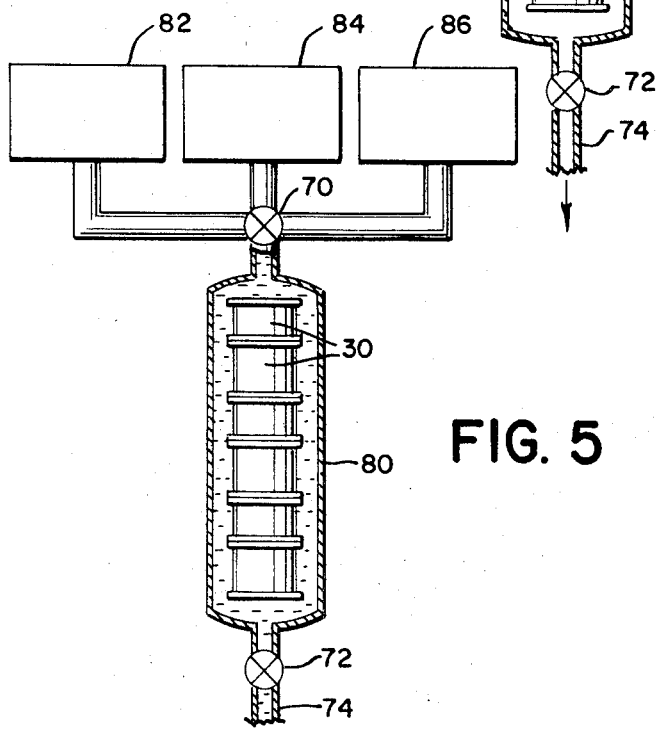

FIG. 5 shows an arrangement for monobath processing. Here containers of monobath developing solution 82 and wash water 84 are located adjacent a sealed tank 80. A vacuum drying source 86 is provided here and communication to the tank for containers 82 and 84 and source 86 is through control valve 70. Again, an outlet valve 72 is provided in an outlet line 74.

In monobath processing, time and temperature are relatively unimportant, so more spools 30 can be stacked yielding proportionately higher production rates. The processing chamber 80 may be opened at one end for easy loading at the spools and for gravity feed of the solution. Alternately, the chamber may be completely closed to permit faster drying by a vacuum source and force pumping of the various solutions. This also holds true with respect to the embodiment of FIG. 4.

As should be apparent the size of the developing equipment is relatively small. For example, the tanks 60 and 80 need only be as long as the length of the number of spools to be stacked. The diameter of the tanks need be only slightly larger than the diameter of the spools. As a general rule of thumb, a coil of film with separator material therein has only about a 30% greater diameter than the same film wound tightly. Also, the developing equipment is fairly simple and has relatively few, if any, moving parts.

It should be understood that the present invention has many advantages. For example, there is a considerable increase in production speed since the film is processed, developed and dried in a parallel manner rather than in a serial manner, such as by a serpentine path of a film through one or more tanks. As also should be apparent, one or more entire rolls of film are passed through the solution (or solution passed through film) at one time. Moving the solution through the entire roll of film minimizes the number precision of moving parts which are required for processing large quantities of film. Further, the problems of handling tacky films are eliminated by maintaining a spaced coil of film from dry input to dry output.

The introduction of the soluble spacers provides positive spacing of the film during a dry pre-process wrap-up. Application of the spacer material can be accomplished by apparatus separate from the camera or self-contained by the camera.

While the use of the soluble separator material has been described with respect to photographic film, it should be understood that there are other applications for this technique. For example, any coil of web material can be processed, such as metal foil which is to be electroplated. Here the foil is wound on a spool with the separator material providing the spacing, the separator material dissolved, and the electroplating carried out in a parallel manner with the spacing being held by the spool flanges.

While preferred embodiments of the invention have been described above, it will be understood that these are illustrative only, and the invention is to be limited solely by the appended claims.

What is claimed is:

1. A method of processing a web of an exposed photographic film having planar surfaces comprising the steps of applying particles of a solid, solvent soluble, particulate material to portions of one surface of the film, winding said film in a coil with the particulate material between opposing surfaces with said opposing surfaces of the convolutions of the coil being spaced apart by said particulate material, dissolving the particulate material, and developing the film.

2. The method of claim 1 further comprising the step of clamping both edges of the film after the web has been wound into a coil, the separation of the convolutions of the coil being maintained by the clamping after the particulate material has been dissolved.

3. The method of claim 1 wherein said particulate material is substantially non-reactive with said photographic film.

4. The method of claim 1 wherein said particulate material is reactive with the photographic film in the developing process.

5. The method of claim 1 wherein said developing step comprises sequentially immersing the coil of film in different processing solutions.

6. The method of claim 5 further comprising the step of drying the film by passing air through the spaced convolutions of the coiled web of developed film.

7. The method of claim 1 further comprising the step of unwinding the film from the coil.

8. The method of claim 1 wherein said developing step comprises immersing the coil of film in a monobath processing solution.

9. The method of claim 8 further comprising the step of drying the film by passing air through the spaced convolutions of the coil of developed film.

References Cited

UNITED STATES PATENTS 2,860,977    8/1953    Tregillus _____ 96—61M

FOREIGN PATENTS 21,692    1907    Great Britain _____ 96—63

NORMAN G. TORCHIN, Primary Examiner

M. F. KELLEY, Assistant Examiner

U.S. Cl. X.R.

96—50, 61, 63